March 17, 1970  R. H. JAGGI  3,500,960
CENTRAL LUBRICATING SYSTEM OF THE SEQUENTIALLY
OPERATING PISTON VALVE TYPE
Filed Aug. 20, 1968  4 Sheets-Sheet 1

INVENTOR.
ROBERT H. JAGGI
BY
OSTROLENK, FABER, GERB & SOFFEN
ATTORNEYS

United States Patent Office 3,500,960
Patented Mar. 17, 1970

3,500,960
CENTRAL LUBRICATING SYSTEM OF THE SEQUENTIALLY OPERATING PISTON VALVE TYPE
Robert H. Jaggi, Bergenfield, N.J., assignor to Auto Research Corporation, Boonton, N.J., a corporation of Delaware
Filed Aug. 20, 1968, Ser. No. 754,050
Int. Cl. F01m *1/06;* F16k *11/00*
U.S. Cl. 184—7                                   22 Claims

ABSTRACT OF THE DISCLOSURE

A central lubricating system having a plurality of sequentially operable reciprocating pistons controlling the flow of lubricating fluid to associated bearings to be lubricated; the pistons each being housed in individual cylinder blocks, and conduits joining successive blocks to form a unit; these conduits being divided into two separate branches, one for control of piston operation and one for supplying lubricating fluid to the bearings; each of the pistons may include means indicating its operative or inoperative condition and means for stopping the flow of lubricating fluid to the remaining pistons upon the occurrence of a fault in its operation; a plurality of units may be joined by conduits to form a system.

---

This invention relates to lubricating systems and is more particularly concerned with sequential lubricating systems capable of supplying metered amounts of lubricant to a plurality of bearings or points to be lubricated.

Central lubricating systems are well known. Such systems are particularly useful with large machinery having a plurality of moving parts and bearings to be lubricated and in plants having many machines with many bearings and moving parts. These lubricating systems permit the use of large central reservoirs of lubricant and central pump equipment and thereby provide economic advantages over smaller decentralized lubricating systems. In particular, lubricant can be purchased in and pumped from larger containers and can be more economically stored. Furthermore, central systems eliminate wasteful duplication of lubricating equipment.

Central lubricating systems of the sequential type are commonly constructed having a plurality of reciprocating pistons. One such system is shown in U.S. Patent No. 2,937,716 to A. R. Schlosshauer. As can be seen in this patent, the pistons operate in sequence and each supplies lubricating fluid to a device, such as a bearing, individually associated with the piston. Each of the pistons is movable within a cylinder. As the piston moves from a first end of the cylinder into the chamber defining the other or second end, the piston forces lubricating fluid out the second end.

The quantity of lubricant supplied to each bearing is determined by the size of the lubricant filled chamber in each cylinder and by the frequency of reciprocation of the pistons.

In order to control the sequence in which each bearing or point receives lubricant, the fluid forced out of a cylinder by one piston is fed through both a conduit in the cylinder block of the immediately preceding piston in the sequence and through a conduit through that preceding piston itself. It is then conducted to the bearing or point to be lubricated. This ensures that the fluid will flow to a particular bearing or point only after the piston in the cylinder where the lubricant charge is located has shifted from the first to the second cylinder end and after the piston in the next preceding cylinder block has also fully shifted, so that the conduits through the preceding cylinder block and the piston therein are in registry.

When one piston malfunctions for any reason, e.g., it is fouled by impurities in its cylinders, and it cannot complete a full stroke, the outlet passage leading to a bearing from the next succeeding cylinder is blocked since the passage includes a conduit through the malfunctioning piston, which conduit properly registers to comprise part of the flow path only after the piston fully shifts. The next succeeding piston is prevented from shifting to expel the fluid in the chamber of its cylinder as the outlet from this chamber is blocked.

Each piston is impelled to move toward the second cylinder end to expel fluid from the chamber at said second end by lubricant flowing in at the first cylinder end and pressing on the first end of the piston. There is an outlet port from each cylinder part way down from the first cylinder end, that is blocked by the piston until the piston has shifted sufficiently toward the second cylinder end to uncover this port. This port usually would be located so as to be uncovered when the piston has completed its stroke. Further lubricant flow into the cylinder first end passes out this exit port and is conducted to the first end of the next succeeding cylinder.

As is now apparent, if one piston is prevented from completing its stroke, the next succeeding piston and all further succeeding pistons will not be impelled to shift by incoming lubricant, whereby the operation of the entire sequential system will cease.

Systems such as these are also frequently provided with means for indicating completion of the entire cycle of operation of all of the pistons. But, these indicating means have not indicated which of the plurality of pistons is not operating properly when there is a fault in the system. As a result, the entire system must be shut down for a considerable period of time, causing great expense and inconvenience, until the inoperative piston is located and repaired or replaced. The necessity for hunting for the location of a breakdown has made such centralized systems impractical in large installations where they would otherwise be most desirable.

The above described central lubricating systems have other limitations. It is advantageous to be able to lubricate a plurality of bearings with the stroke of a single piston. See, for instance, Patent No. 2,937,716. However, this prior art has required using pistons having very long strokes. Such long strokes take more time and increase the probability of faults developing in the system through fouling of the cylinder walls. With the present invention, it is contemplated that only one or a small number of separate bearings or points will be lubricated by the output of one stroke of a single piston, whereby the piston stroke may be kept short.

Furthermore, in the prior art sequential systems, where lubricant from one piston must be pumped through conduits in the preceding piston, the size of the conduit through the sequentially preceding piston is enlarged (see Patent No. 2,937,716), thereby requiring more lubricant to fill the conduit itself before any passes to the bearing. This creates inaccuracy in the measurement of the quantity of lubricant going to the bearing and wastes lubricant which must fill and uselessly sit in the conduit. Furthermore, the lubricant forms a pool which may fill with dirt and impurities which are not flushed through by each successive charge of fluid.

The repair or replacement of an individual piston, or of the cylinder it moves through, or of the conduits leading to or from this cylinder, is an additional problem not successfully met by the prior art. In the prior art, the entire system of pistons is in a single unit, or in smaller units in the vicinity of each machine being lubricated. It is desirable to have each piston positioned in a cylinder in a separate block so that a faulty piston or cylinder or conduit communicating with the cylinder may be easily replaced by replacing the block containing it. Lubricating systems of the prior art have generally included complex networks of paths for the lubricating fluid and for the control of the pistons. As a result, it is impractical to develop these systems in the form of individual blocks each containing a piston, a cylinder for the piston to move through and connecting conduits, with each block being easily connected to an adjacent substantially identical block to form a single unit. The present invention permits the provision of such individual units by simplifying the lubricant flow path network.

It is the primary object of the present invention to provide an improved centralized lubricating system.

It is another object of the present invention to provide a composite unit, having a plurality of sequentially operable pistons, for the centralized lubricating system.

It is another object of the present invention to provide a composite unit including means for halting further unit and system operation in the event of a breakdown anywhere in the system.

It is another object of the present invention to provide a unit including means for sensing and reacting to the presence of a malfunction in any component of unit.

It is another object of the present invention to provide a composite unit wherein the volume of lubricant pumped by each piston in the unit may be readily varied as desired.

It is another object of the invention to provide a central lubricating system of the sequential operating piston valve type constructed of compact and easily maintainable and separable units.

It is a further object of the instant invention to provide a central lubricating system of the above described type which may be manufactured of simple piston containing blocks which may be simply joined to form a single unit and each of which may be easily replaced upon the occurence of a breakdown in that block.

It is a further object of the instant invention to provide a central lubricating system of the above described type for supplying metered amounts of lubricant to a plurality of devices wherein the lubricating system has means for indicating when a particular piston in the system has not properly operated.

Another object of the instant invention is to provide a simple and inexpensive cylinder block containing a reciprocating piston which is appropriate for use in a centralized lubricating system of the above described type.

Another object of the instant invention is to provide such a cylinder block having separate conduits for control of piston movements and for the feeding of lubricant to a bearing or other device.

It is another object of the invention to provide a uniform cylinder block which can be made to provide one of many different and preselected lubricant volumes.

The above objects, features and advantages of the instant invention will become apparent along with other objects, features and advantages upon a reading of the following detailed description of the instant invention in conjunction with the drawings as follows:

Figure 1:
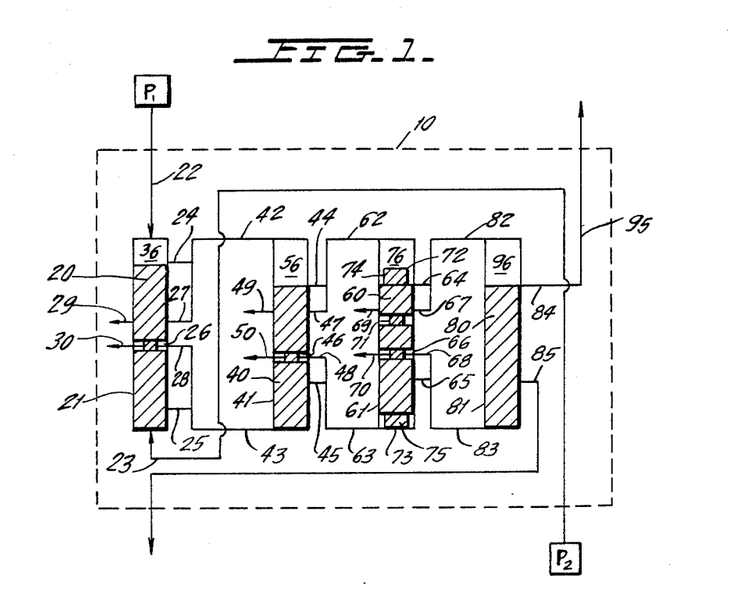
FIGURE 1 is a schematic drawing of one embodiment of the instant invention showing a single composite unit comprised of a plurality of piston containing cylinder blocks.

Referring to FIGURE 1, a composite unit 10 of piston containing cylinder blocks is schematically shown. Unit 10 may be one unit of a larger lubricating system (as discussed below in connection with FIGURE 2) and may be associated with one or with several machines in a large plant.

Unit 10 has a main or pilot piston 20 and a series of any number of satellite or indicator pistons illustratively shown as 40, 60 and 80. Each of pistons 20, 40, 60, 80 is movable in its respective cylinder bore (shown generally as rectangles 21, 41, 61, 81, respectively) between a top position and a bottom position. In FIGURE 1, all of the pistons are in their bottom positions.

Conduits 22 and 23 are, respectively, connected at the top and bottom ends of the cylinder 21 for pilot piston 20. These conduits serve as inlets from pumps $P_1$ and $P_2$, respectively, for delivering lubricating fluid to the top and the bottom, respectively, of the cylinder 21. Lubricating fluid must be delivered to only one end of cylinder 21 at any time. As will be discussed below, a single pump may be used with a means that properly directs the flow therefrom.

Also connected to the cylinder 21 are outlet conduits 24 and 25. These outlets conduits communicate with the bore of cylinder 21 inward from the ends of the cylinder and are blocked off by the piston 20. Each is uncovered only when the piston 20 has shifted fully to the end of the bore opposite the end of the bore with which that conduit communicates.

As illustrated by FIGURE 1, the inflowing lubricant through conduit 22 drives piston 20 down. When that piston reaches its bottom position of FIGURE 1, only then is conduit 24 uncovered and further lubricant inflow, which can no longer move piston 20, is directed out conduit 24. When lubricant flows in through conduit 23, a similar result is obtained, whereby conduit 25 is uncovered after piston 20 has attained its upper position. Once conduit 25 is uncovered, further fluid inflow through conduit 23 passes out conduit 25.

Piston 20 has a peripheral groove 26 located in from its ends for purposes which will become apparent hereinafter. This groove is meant for registering with particular inlet and outlet ports at different times, as will be described.

Groove 26 has a thin width approximating the width of upper and lower conduits 27, 28, respectively leading into cylinder 21 and of upper and lower conduits 29, 30, respectively, leading away from cylinder 21 to bearings or points to be lubricated. Compare FIGURES 3–6. As lubricant is pumped through groove 26, a pool of liquid is not built up in the groove, as would occur were the groove of great width. (See Patent No. 2,937,716.) A large pool will stagnate and will store impurities and dirt instead of flushing them through each time a new charge of lubricant is pumped. Also, accuracy in apportioning a charge of lubricant is reduced when a charge of lubricant feeds into or out of a large volume pool created by a large width piston groove. Further, a large pool would trap air, which would slip past a piston, so that while giving the appearance of working properly, a piston might be pumping air, not liquid lubricant. With the present invention, the newly pumped charges of lubricant pass through either the upper conduits 27, 29 or the lower conduits 28, 30, and through groove 26 without forming stagnant pools.

In the position shown in FIGURE 1, groove 26 is in alignment with the lower inlet and outlet conduits 28 and 30, respectively. When, as will be discribed, satellite piston 40 moves to its bottom position, as in FIGURE 1, the lubricant beneath it is pushed out conduit 43, to be described, and through conduit 28, groove 26 and conduit 30, permitting the flow of lubricant to continue to a bearing communicating with conduit 30.

When piston 20 is in its upper position, its groove 26 is in alignment with inlet and outlet conduits 27 and 29, respectively. When piston 40 moves up, as will be described, the lubricant above it is pushed out conduit 42, to be described and through conduit 27, groove 26 and conduit 29 permitting the flow of lubricant to continue to a bearing communicating with conduit 29.

Note that conduit 42 to cylinder 41 communicates with one conduit, 24, when conduit 42 is serving as the inlet conduit to cylinder 41 and with another conduit, 27, when conduit 42 is serving as the outlet conduit from cylinder 41 through groove 26 and conduit 29 to a bearing. The same is true for conduit 43 to cylinder 41 and conduits 25 and 28 to cylinder 21.

The cylinder 41 for satellite piston 40 has conduits 42 and 43 connected, respectively, into the upper and lower ends of cylinder 41. When piston 20 has moved down to its lower position and has uncovered conduit 24, further lubricant pumped into cylinder 21 passes through conduits 24 and 42 to the top of cylinder 41. Similarly, when piston 20 has moved to its upper position, and has uncovered conduit 25, further lubricant pumped into cylinder 21 passes through conduits 25, 43 to the bottom of cylinder 41. In addition to conveying incoming fluid to cylinder 41, conduits 42 and 43 also convey outgoing fluid to bearings associated with conduits 29 and 30, respectively, when fluid is forced from either the top or the bottom, respectively, of cylinder 41. Also connected to the cylinder 41 are conduits 44 and 45. These conduits function in the same manner with respect to piston 40 as do conduits 24 and 25 with respect to piston 20, in that when piston 40 has shifted, e.g. to the bottom, one of these conduits e.g. 44, is uncovered and additional flow into cylinder 41 passes to the top of cylinder 61.

Piston 40 has a peripheral groove 46 around it similar in design and width to peripheral groove 26 on piston 20. Were groove 46 too wide, it would store lubricant or trap air with the drawbacks above noted. This groove is positioned on piston 40 so that when the piston is in the lower position shown in FIGURE 1, groove 46 registers with inlet and outlet conduits 48 and 50, respectively. When piston 46 is in its upper position, groove 46 registers with inlet and outlet conduits 47 and 49, respectively. The alignment of groove 46 with either the upper or the lower pair of conduits provides a path for the flow of lubricant from the corresponding end of the next succeeding cylinder 61, through the conduits and groove, to associated bearings.

Conduit 62 leading from the top of cylinder 61 communicates with conduit 44 when 62 is an inlet to the top of cylinder 61 and with conduit 47 when 62 is an outlet from the top of cylinder 61. Similarly, conduit 63 leading from the bottom of cylinder 61 communicates with conduit 45 when 63 is an inlet to the lower end of cylinder 61 and with 48 when 63 is an outlet from the lower end of cylinder 61.

Cylinder 61 is identical with cylinder 40. However, piston 60 within cylinder 61 differs from piston 40 in three noticeable respects. First, piston 61 is longer. It fills more of cylinder 61. Therefore, for each stroke of piston 60, less lubricant is pumped than for each stroke of piston 40. Hence, one method of varying the volume of lubricant pumped by a piston is varying its length. In completing a full stroke from one end to the other end of the cylinder, piston 60 traverses a shorter distance than piston 40. Therefore, lower groove 66 which registers with conduits 68, 70 when piston 60 is at the lower position will not move up far enough to register with conduits 67, 69 when piston 60 is in the upper position.

This leads to the second noticeable difference between pistons 40 and 60. Piston 60 has a second groove 71 located so that it will register with upper cylinder conduits 67, 69 when piston 61 is in its upper position. Thus, pumped lubricant from the next succeeding satellite piston 80 can exit through upper conduits 67, 69 and lower conduits 68, 70 to associated bearings.

With piston 60 being longer, when the piston is in the lower position its upper end 72 has not descended beneath the entry port to conduit 64. Similarly, when the piston is in its upper position, its lower end 73 has not ascended above the entry port to conduit 65. Thus, conduits 64, 65 would be permanently blocked. One alternative is to shift the entries to conduits 64, 65 closer to the ends of cylinder 61 so that piston 60 will clear the entries. (See this suggested for the pilot piston 20.) It is desirable, however, for reasons of economy to make all cylinders identical, if possible.

This leads to the third noticeable difference between pistons 40 and 60. Piston 60 has upper and lower narrowed diameter end sections 74, 75, respectively, which extend inward from each end 72, 73, respectively of piston 60 a distance sufficient to permit exit flow through the entry ports to conduits 64, 65, respectively. The end sections 74, 75 fill the open volume of cylinder 61, thereby reducing the volume of lubricant that can flow into a cylinder. The end sections also extend out to shorten the piston stroke, whereby a lesser volume of lubricant is pumped by each stroke of piston 61. On the other hand, the lubricant flowing into one of the ends of cylinder 61, upon shifting the piston to the opposite cylinder end, can pass around a narrowed piston end section to exit through one of the exit conduits 64, 65.

As a matter of choice one or more than one of all of the pistons 20, 40, 60, 80 may be designed as a dual groove, rather than as a single groove piston. Both types of pistons operate in precisely the same manner with the same result qualitatively. Only the quantity of lubricant pumped is varied.

An alternative manner of varying the lubricant pumped from a cylinder is to alter its width or diameter.

Satellite piston 80 is the last in sequence of the pistons in unit 10. It needs no peripheral groove like groove 46 of piston 40. Its cylinder 81 has no need for the conduits, e.g., 47, 49 and 48, 50 associated with the peripheral groove, e.g. 46, in the preceding pistons. This is because the peripheral piston groove serves as part of the path from a next succeeding cylinder to a bearing that is associated with the conduits with which the groove is in registry; and the last piston 80 in the unit has no succeeding piston from which it receives lubricant to be passed along the bearings.

Associated with the piston 80 are conduits 82 and 83 which function as inlets and outlets to cylinder 81, just as conduits 42, 43 serve for cylinder 41. Outlet conduits 84 and 85 communicate with cylinder 81 inward from the ends thereof a distance, as with conduits 44 and 45 for cylinder 41, so that conduits 84, 85 are each uncovered, respectively, when piston 80 reaches the bottom or top position in its cylinder 81.

Figure 2:
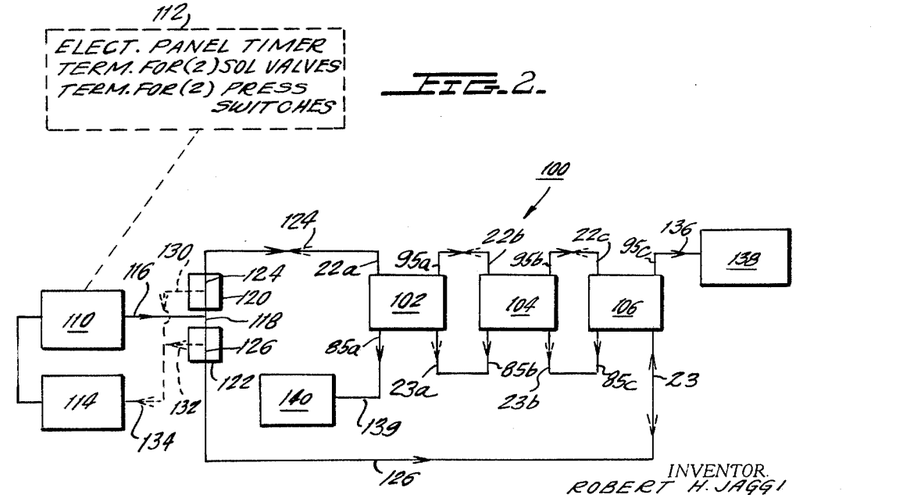
FIGURE 2 is a schematic drawing of a lubricating system comprised of a plurality of units of FIGURE 1.

Outlet conduit 84 is connected to conduit 95 which passes to a conduit, equivalent to 22, leading into the upper end of the cylinder of the pilot piston of one next succeeding unit, like unit 10, in the lubricating system see FIGURE 2). Similarly, outlet conduit 85 is connected to a conduit, equivalent to 23, leading into the lower end of the cylinder of the pilot piston of another next succeeding unit, like unit 10, in the lubricating system (see FIGURE 2). FIGURE 2 considers a system with a plurality of units like unit 10.

In the event that unit 10 is the last unit in the sequence of units in the lubricating system, or the only unit if the system is small, one or both of conduits 95, 85 will communicate with a pressure switch which senses a pressure build up in either of conduits 95, 85 and signals that a system cycle has been successfully completed, as more fully discussed in connection with FIGURE 2.

The system above described operates in the following manner. When a charge of lubricant is pumped by central pump $P_2$ into inlet conduit 23, the lubricant flows into the lower end of the cylinder 21 in which pilot piston 20 is situated. If piston 20 is operating properly, the charge of lubricant forces it to its upper position, thereby exposing conduit 25. The continuously pumped lubricant flows through conduits 25, 43 to the lower end of cylinder 41 in which satellite piston 40 is located. Piston 40 is forced to its upper position. In moving up, piston 40 forces from cylinder chamber 56, which is above piston 40, the lubricant which had been pumped there during the previous cycle.

The lubricant from chamber 56 moves through conduits 42, 27 through peripheral groove 26, which moved into alignment with the conduits 27 and 29 as a result of piston 20 having moved to its upper position, and through conduit 29 to a bearing or other device (not shown) to be lubricated.

After piston 40 has completed its move up, conduit 45 is exposed to the chamber beneath piston 40 and the lubricant passing into this chamber from conduit 43 passes through conduits 45, 63 to the narrow chamber surrounding extension 75, on piston 60. Piston 60 then moves up in the manner described for piston 40. The lubricant in chamber 76 above piston 60, as with piston 40, exits from chamber 76, through conduits 62, 47, through groove 46 which moved into registry with conduits 47, 49 as a result of piston 40 having moved to its upper position, and through conduit 49 to a bearing or other device (not shown) to be lubricated.

After piston 60 has completed its movement upward, conduit 65 is exposed to the chamber beneath psiton 60 and the lubricant passing into this chamber from conduit 63 passes through conduits 65, 83 to the space beneath piston 80 in cylinder 81. Piston 80 moves upward like pistons 40, 60.

The lubricant in chamber 96 above piston 80, as with piston 40, exits through conduits 82, 67 through upper groove 71 which moved into registry with conduits 67, 69 when piston 60 had previously moved up, and through conduit 69 to a bearing associated with the conduit.

As has been discussed above, piston 60, unlike the other pistons shown, has two axially spaced peripheral grooves 56 and 71. When piston 80 is moved down, to the position now illustrated in FIGURE 1, the lubricant exits from the chamber beneath piston 80 through conduits 83, 68, through lower groove 66 which moved into registry with conduits 68, 70 when piston 60 had previously moved down, and through conduit 70 to a bearing associated with the conduit. It can be seen, therefore, that the dual groove pistons operate in the same manner as the single groove pistons, although they are structurally different.

A unit 10 may have any number of satellite pistons intermediate its pilot piston and final satellite piston 80. All other pistons operate like one of pistons 40, 60 and move in sequence. If the pistons are shifting up in sequence, as with the unit of FIGURE 1, all pistons operate in sequence to move to their upper positions. In so moving, they pump the lubricant in the cylinder chamber above them through conduits communicating with a groove around the next preceding piston and to a bearing being lubricated.

When final piston 80 is moved to its upper position in its cylinder, the conduit 85 communicates with the chamber beneath the piston 80 and lubricant flowing from conduit 83 through the chamber beneath piston 80 and through conduit 85 flows to another unit like unit 10 or to a cycle completion sensing means, all to be later described. The pumping by pump $P_1$ of lubricant into conduit 22 when the pistons are in their upper positions causes the downward movement of each of the pistons in a manner similar to that described for the upward movement. Each of pistons 20, 40, 60, 80 is symmetric about its midpoint, as is each of cylinders 21, 41, 61, 81. Hence, the corresponding grooves and conduits at the upper halves of the pistons and conduits function identically with the grooves and conduits at the lower halves.

When final piston 80 has completed its descent, continuing lubricant flow through conduit 82 will exit through conduit 95 to a structure functionally identical with that receiving flow from conduit 85.

Each of the pistons forces the lubricating fluid in the chambers formed at the ends of its cylinder to a bearing or other device to be lubricated. The volume of lubricant pumped per unit time by each piston may be varied uniformly for all of the pistons by varying the rate of flow of fluid into the pilot piston, for instance, by varying the pumping rate of pumps $P_1$ or $P_2$ or by the use of a flow restriction, e.g. a narrowed bore in the conduit between the pumps $P_1$ or $P_2$ and the cylinder 21.

To vary the volume of lubricant pumped by each piston individually, the cross sectional width of each cylinder or the length of each piston as compared with the length of the cylinder therefor, which varies the length of the piston stroke, may differ among the pistons.

In the event that flow to the inlet of any cylinder is cut off either because of a blockage in the conduit leading to it or because the piston is blocked from moving due to breakage or fouling of its pathway, the piston in that cylinder will not receive any pressure to cause it to shift. If it does not shift, flow from the preceding cylinder will not pass through the cylinder with the stationary piston because the outlet conduits, e.g. 44, 45, for that cylinder are blocked. The entire system will cease operating. An attendant will soon thereafter be made aware of the malfunction by any appropriate indicator, to be described, or by the mere cessation of operation of the lubricator. He can then repair the malfunction.

The design of the apparatus of the invention has insured that in a large lubricating apparatus, a single malfunction affecting only one or two small bearings will not go unnoticed. Thus, a few elements will not miss necessary lubrication which might cause premature breakdown of the installlation receiving lubrication.

Unit 10 of FIGURE 1 is usually used in a system which always includes a pump, and may include other similar units designed in accordance with the invention, a flow reversing means and an indicating means. The system 100 of FIGURE 2 is a sequential arrangement of composite units, such as unit 10. The individual units 102, 104, 106 are each designed in accordance with the foregoing discussion and are comprised of pistons and cylinders formed in any arrangement discussed above for the unit 10. While three units 102, 104, 106 are shown, the system may include any number, so long as adequate system pressure can be maintained throughout.

The separate units may each be located near a different machine or installation to be lubricated, which gives the central lubricating system some benefits of decentralization, e.g. auxiliary pumping is not required between a unit and the installation being serviced.

The system 100 includes a central pump 110. Dependent upon the needs of the system, pump 110 may operate continuously or may be adapted to operate for one complete system cycle after a predetermined period elapses.

A panel 112, shown schematically, may have a conventional timer thereon for turning on pump 110 after the predetermined period elapses. Pump 110 is connected with a lubricant reservoir 114 from which it draws the lubricant to be pumped out.

Pump 110 has an outlet conduit 116 leading to a junction 118 which passes the flow of pumped lubricant to two solenoid valves 120, 122. Valves 120, 122 control the direction of flow of lubricant into one of conduits 124 or 126. A solenoid valve is a valve including an element that is movable between a position that blocks and a position that opens a flow path. A conventional electrically operated solenoid element is attached to the valve element for moving same between its two positions as a result of energization and deenergization of the solenoid. When solenoid valve 120 is actuated and valve 122 is not, passage 124 to one side of the cylinder of the pilot piston of the first unit 102 in the sequence is opened for outlet flow from pump 110 and passage 126 to one side of the cylinder of the pilot piston of the last unit 106 in the sequence is closed to outlet flow from pump 110. When the roles of the solenoid valves are reversed, passage 124 is closed to outflow from pump 110 and passage 126 is opened. A pressure sensing switch, to be described, is electrically connected at panel 112 to close and open the circuits to the solenoid switches to cause their role reversal. There are relief passages 130 from switch 120 and 132 from switch 122 which both lead to relief conduit 134 which returns liquid to reservoir 114. The relief passages, as will be described below, merely transmit the flow from beneath the ends of the pilot pistons in each unit. Switches 120, 122 are so designed that when passages 124, 126 thereof are each respectively open, relief passages 130, 132 respectively through them are each closed, and vice versa.

Conduits to and from units 102, 104, 106 are correspondingly numbered to those in FIGURE 1, with a, b, c following the numbers, so that the functions of these conduits and of the units in a whole system may be understood.

Pump outlet conduit 124 leads to inlet conduit 22a of unit 102, which is analogous to unit 10. The inflow through conduit 22a drives all pistons (not shown) in unit 102 down, as with unit 10. The continued flow from pump 110 then moves out conduit 95a, as with unit 10, and into conduit 22b into unit 104. Lubricant is pumped through unit 104 and then through unit 106 and the continuing lubricant flow exits from unit 106, through conduit 95c through conduit 136 and from there into pressure sensing means 138.

Pressure sensing means 138 will only sense pressure if all pistons have properly operated and the pumped flow can pass to means 138. Hence, means 138 is a cycle completion sensing means. If any piston malfunctions and fails to completely shift, none of the pistons subsequent to that one will have lubricant pass to it to cause it to shift. Hence, no pressure will ever be sensed by means 138.

Pressure sensing means 138 may be connected to an indicator that will indicate cycle completion. Means 138 may additionally be a conventional pressure switch for cutting off pump operation and for reorienting solenoid switches 120, 122 from their one mode to their other mode. Hence, pressure switch 138 would operate switches 120, 122 to close passage 124 to outflow from pump 110 and to open passage 126 to this outflow. When the pump 110 next operates, it will pump lubricant to the other sides of the pistons thereby shifting all the pistons up again.

If the system is operating properly, switch 138 operates automatically. In the event of a breakdown in one of the units 102, 104, 106 or in any other component, piston operation and shifting halts and pressure never reaches switch 138. A separate conventional timer is provided on panel 112 which is restarted from zero after each time a pressure switch operates and the pump 110 has begun to operate for a new cycle. In the event that pressure switch 138 is not operated after a predetermined period, which would show that a breakdown has occurred somewhere in the system, the timer would give a signal, which may be visible or audible, to an operator to warn him to correct the malfunction. Also, or alternatively, the timer may shut the pump 110 down after a predetermined period.

As will be described below, the pistons may be individually provided with indicator means so that an operator may readily and rapidly discover the location of a breakdown.

Refer to FIGURE 1. As each of the satellite pistons 40, 60, 80 reciprocates, the lubricant above the piston, if it is moving up, and the lubricant below the piston, if it is moving down, can pass out of the cylinder and through connecting conduits to an associated bearing. However, for the pilot piston 20, there are no outlet connections to a preceding piston for transmitting the lubricant above or below the pilot piston to associated bearings. The small volume of lubricant which is stored above or below each pilot piston must, however, be able to be moved somewhere, or else the pilot piston will not be able to shift against the pressure of the lubricant already within the cylinder. As the system in FIGURE 2 is designed, it automatically provides relief for the lubricant stored at the ends of the cylinder through which piston 20 moves.

Return to FIGURE 2 and refer as needed to FIGURE 1. Assume that all the pistons (not shown) in units 102, 104 and 106 start operation in their upper positions. As the pilot piston in unit 102 descends, the lubricant in the chamber beneath that piston exits to relief from that chamber, through conduit 23a and then through conduit 85b of unit 104, as indicated by the broken line directional arrow for these two conduits. Keep in mind that while the pilot piston in unit 102 has descended, all of the pistons in units 104 and 106 are still in their upper positions. Treat unit 104 as being identical to unit 10 of FIGURE 1. Assume the pistons to be still in their upper positions. The lubricant from conduit 85b flows into the cylinder chamber beneath piston 80, and travels out conduit 83, through conduit 65, beneath piston 60, through conduits 63, 45, beneath piston 40, through conduits 43, 25, and beneath pilot piston 20.

From beneath the pilot piston 20 of unit 104, the lubricant passing to relief now passes out conduit 23b and through conduit 85c, as indicated by the broken line directional arrow for these conduits, and into unit 106 into the space beneath the piston equivalent to piston 80 for unit 106. The lubricant passing to relief passes through unit 106 in the same fashion as it passed through unit 104 and exits from unit 106 through conduit 23c.

The lubricant then passes in the same fashion through any other units in the system and then through conduit 126, as indicated by the broken line directional arrow for conduits 23c, 126. As was noted above, solenoid switch 120 is set to allow outflow from pump 110 to pass into conduit 124. Switch 122, therefore, is set to block outflow from pump 110 from passing through conduit 126. However, switch 122 is set to permit the relief flow through conduit 126 to pass through conduits 132, 134 and back into reservoir 114, as indicated by the broken line directional arrows. Thus, there is no pressure build-up beneath the pilot piston of unit 102 because the pressure can pass to relief through the pathway just described.

After all the pistons in unit 102 have descended, the pilot piston of unit 104 descends. The lubicant stored in the space beneath this pilot piston similarly exits to relief through conduit 23b and passes as described into and through unit 106 and through conduit 126, solenoid switch 122 and back to reservoir 114, in the identical manner as with unit 102. The same sequence of events takes place after the descent of the pilot piston in each subsequent unit in the system, so that for all pilot pistons, there is pressure relief, and each pilot piston is thereby enabled to properly operate.

Pressure switch 138 operates after all the pistons in the system have descended.

When pressure switch 138 has operated and caused the solenoid switches 120, 122 to switch their modes, the outflow from pump 110 passes through conduit 126 into conduit 23c beneath the pilot piston of unit 106. Lubricant entering beneath the pilot piston of unit 106 forces that piston up and all the other pistons in the unit then move up in sequence. As the pilot piston in unit 106 ascends, the lubricant above it passes to relief by exiting through conduit 22c and travels through conduit 95b into the cylinder space above the final piston 80, like in FIGURE 1, of unit 104, as indicated by the broken line directional arrow. The lubricant passing into unit 104 through its conduit 95b enters its equivalent of conduit 84, and passes through conduits 82, 64, cylinder 61, conduits 62, 44, cylinder 41, conduits 42, 24 and out conduit 22b above the pilot piston of unit 104. After the lubricant passing to relief has passed through unit 104 by passing across the top of each of the pistons therein, it moves through conduits 22b, 95a, as indicated by a broken line directional arrow, through unit 102 in the same fashion as with unit 104. Then it passes through any additional units. From the final unit, the lubricant passing to relief exits through conduits 22a and 124, as indicated by the broken line directional arrow, through solenoid switch 120 through relief passage 130, relief conduit 134 and into reservoir 114.

After all the pistons in unit 106 have ascended, the continued flow of lubricant through conduit 126 moves through conduits 85c, 23b into the space beneath the pilot piston in unit 104 and causes that pilot piston to ascend. The lubricant which was above the pilot piston unit 104, as with the lubricant above the pilot piston unit 106, passes out conduit 22b, through conduit 95a, through unit 102 and then through conduit 124, and eventually passes to relief in reservoir 114. All of the pistons in unit 104 then ascend in proper sequence. After these pistons have ascended, the continued flow through conduit 126 passes through conduit 85c and through conduit 23a into unit 102 where it similarly causes the ascent of all of the pistons in that unit. The space above the pilot piston in unit 102 and all other units in the system is similarly connected to relief.

The outlet from the final unit 102 in the system, after all the pistons therein have ascended, passes through conduits 85a, 139 into pressure sensing means 140. Means 140 is also a cycle completion sensing means. It may be identical in structure and function to means 138. If means 140 is a pressure switch, it would serve to change the modes of the switches 120, 122 to cut off the outflow of pump 110 from conduit 126 and to permit it to pass into conduit 124 and also to send a signal to the timer on panel 112 that a cycle has properly been completed.

Pressure sensing means 148, 140 may be combined into a single unit having conduits 136 and 139 communicating with it.

It is of significance to note that the conduit 124 from pump 110 first enters unit 102 while the conduit 126 from pump 110 first enters unit 106. This is solely for pressure relief purposes since to obtain proper pressure relief, each pilot piston feeds the lubricant going to relief out through the conduit through which the lubricant originally entered to press upon the pilot piston and the lubricant pressing on the pilot piston of each unit must travel back along the identical path it previously traveled to provide proper relief.

There has just been described a complete lubricating system employing units like that schematically shown in FIGURE 1.

Individual piston units which may be used in the unit of FIGURE 1 are shown in FIGURES 3 through 6. The piston units are separated from each other by appropriate flow redirecting plates and gaskets which will be described below. Also, each of the units have end blocks not containing pistons, which contain the terminal conduits, as will also be described below.

The piston units are shown as being complete including piston, cylinder and necessary conduits. The end blocks, and intermediate plates and gaskets are also separate units. A breakdown in any element in the system can readily be repaired by the rapid replacement of one or more defective piston units, end blocks, plates or gaskets, without lengthy periods of unusability for the complete system.

In the following discussion, elements identical to those shown in FIGURE 1 are identically numbered.

Figure 3:
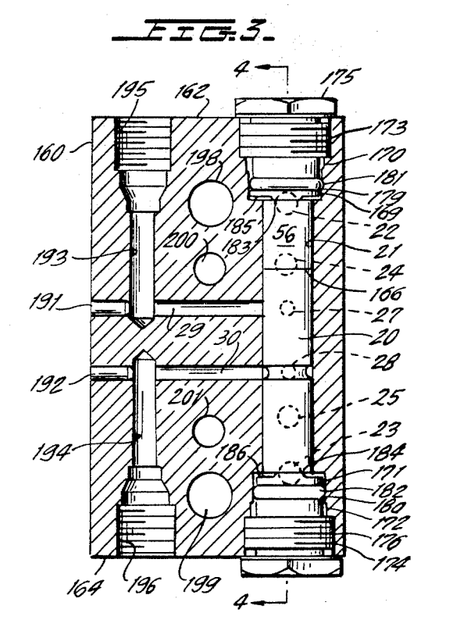
FIGURE 3 is an elevation in cross-section of a pilot piston cylinder block for use in the unit of FIGURE 1.
Figure 4:
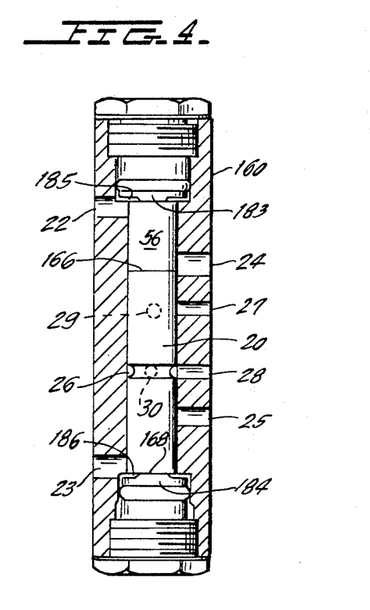
FIGURE 4 is a cross-section of the pilot piston cylinder block of FIGURE 3 taken along the line and in the direction of arrows 4—4.

In FIGURES 3 and 4, a pilot piston unit for a single groove pilot piston 20 is shown. The piston unit includes a flat, rectangular sided cylinder block 160 with a bore extending therethrough from the top face 162 to the bottom face 164 of the block. Within this bore is cylinder 21. Cylinder 21 has a single groove reciprocating piston 20 positioned therein. Piston 20 has flattened upper and lower end surfaces 166, 168, respectively, and has a peripheral groove 26 intermediate its ends. Cylinder 21 has ports leading to conduits in block 160 which are identical in function to the identically numbered conduits 22, 23, 24, 25, 27, 28, 29, 30 of FIGURE 1. The length of piston 20 is such that when it is in its lower position the chamber 36 in cylinder 21 above piston surface 166 communicates between conduits 22, 24, and when it is in its upper position, the chamber beneath piston surface 168 communicates between conduits 23, 25. The conduits 27, 29 and 28, 30 are so positioned that peripheral groove 26 communicates with the former conduits when the piston is up and with the latter conduits when it is down.

While a single groove pilot piston 20 is illustrated, a dual groove pilot piston may be substituted and used in the otherwise identical piston unit. A dual groove piston appears in FIGURES 5 and 6. Both the single groove and the dual groove piston elements are interchangeably usable for either of the pilot and the satellite piston units. The pistons for the satellite piston units may differ in the inclusion of an indicator means on the satellite piston element and its non-inclusion on the pilot piston element.

The bore within which cylinder 21 is located has enlarged counterbores at 169 and 170 at the top of the body 160, and at 171 and 172 at the bottom of the body 160. The enlargements 170 and 172 are tapped as indicated at 173 and 174 to receive threaded plug members 175 and 176.

The plugs 175 and 176 have reduced diameter inside portions 179 and 180, respectively, which carry O-rings 181 and 182, respectively, and they terminate in the nipple projections 183 and 184, respectively. The nipple projections 183 and 184 contact the end surfaces 166, 168, respectively of piston 20 at the upper and lower ends of its stroke and act as stops.

Nipple projections 183, 184 are of narrower diameter than the end surfaces of piston 20. Short annular grooves 185, 186 at the top and bottom, respectively, of cylinder 21 are formed. When the piston 20 is up against projection 183, lubricant flowing into cylinder 21 through conduit 22 fills groove 185 to exert force to begin the piston 20 downward movement before the inflowing lubricant can act on the whole of piston surface 166. Groove 186 functions similarly with respect to piston surface 168 as pumped lubricant flows into cylinder 21 from conduit 23.

Outlet conduits 29, 30 are bores which are sealed at 191 and 192, respectively, and which have outlet bores at 193 and 194, respectively. These outlets have tapped sockets 195 and 196, which are connected to the particular bearings to be lubricated.

Bores 198 and 199 permit insertion of bolts, studs or other joining means 344 through the pilot piston unit. All other piston units, mounting blocks and intermediate plates have corresponding openings so that a joining means may pass through all elements in a unit, like units 10, 102, 104, 106 to hold each of these units together.

Bores 200, 201 serve a function which will be described below.

Due to the analogous numbering of elements in FIGURES 1 3, and 4, the operation of the pilot piston unit of FIGURES 3 and 4 is apparent from the description of FIGURE 1.

Figure 5:
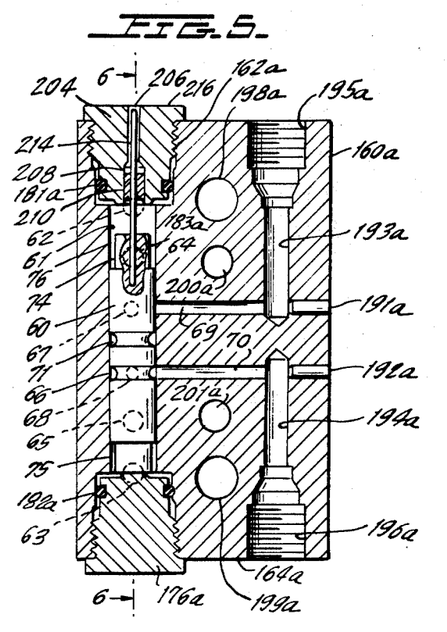
FIGURE 5 is an elevation in cross-section of a satellite piston cylinder block for use in the unit of FIGURE 1.
Figure 6:
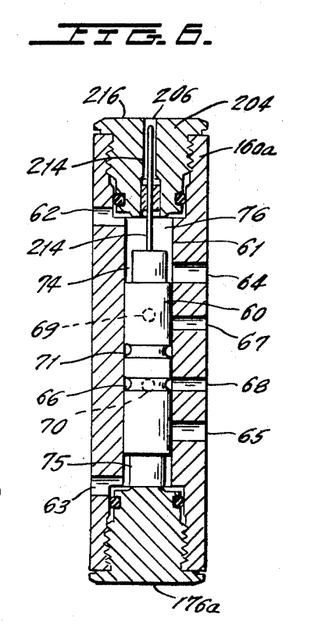
FIGURE 6 is a cross-section of the cylinder block of FIGURE 5 along the line and in the direction of arrows 5—6.

FIGURES 5 and 6 show a dual groove satellite or indicating piston unit which may be used in the systems in FIGURES 1 and 2. Elements analogous to those in the pilot piston unit of FIGURES 3 and 4 are numbered as in those figures with an "a" suffix. The piston unit includes a flat rectangular sided cylinder block 160a having a bore extending completely therethrough from the top face 162a to the bottom face 164a, with the bore having cylinder 61 in it intermediate its ends. Cylinder 61 receives piston 60.

Piston 60 has reduced diameter end portions 74 and 75 and has intermediate axially spaced peripheral grooves 71 and 66, all of which have been described in connection with FIGURE 1. Piston 60, the dual groove piston of FIGURE 1, is illustrated. The piston element in the satellite piston unit may readily be a single groove piston. Without altering the piston unit in any other way, piston 60 in FIGURES 5 and 6 may be replaced with a single groove piston, such as that shown in FIGURES 3 and 4. The single groove piston would, if desired, have an indicator means 214, to be described, attached to it, but this does not substantially affect the single groove piston structure.

The piston unit includes end plugs 204 and 176a which are secured in the piston unit and are identical with plugs 175, 176, except that plug 204 has a through passageway 206 through which an indicator stick 214 may pass, as described below. Top plug 204 is also provided with a lower enlarged passageway 208 having a sealing plug 210 therein.

Satellite piston 60 has an indicator means connected to it or attached to it to indicate its operative position. In the event of a breakdown in the system, the location of the breakdown can be immediately ascertained by scanning the indicator means for each piston to determine which piston has not shifted as it should have. One type of indicator means is illustrated in FIGURES 5 and 6.

An indicator extension rod 214 is mounted in the upper narrowed extension 74 of the piston 60 and extends through sealing plug 210 and through passage 206. Plug 210 is comprised of resilient material that engages the walls around passageway 208 in liquid tight seal and snugly surrounds indicator rod 214 to prevent liquid leakage. However, the hold on rod 214 cannot be so tight as to prevent its moving with piston 60, as described below.

When piston 60 is in the lower position shown in FIGURES 5 and 6, indicator rod 214 is withdrawn within the opening 206. When piston 60 is in its upper position, the indicator rod 214 will extend above the top surface 216 of plug 204, and thereby act as an indicator showing that the piston is in its upper position. As is apparent, the operative position of the piston 60 will at all times be readily visible. Hence, when there is a malfunction and one of the pistons does not operate, since none of the other pistons will be able to operate, the system remains stationary. An operator can readily scan all the indicator rods 214 to determine at which piston unit the malfunction occurred.

While rod indicators are shown, other types of indicators may be attached to or connected with the piston 60 to indicate its position, e.g. electrical switch means may be operated to actuate a remote signal device.

While indicator means are shown in use only with satellite pistons, pilot pistons may readily be adapted with an indicator means, like rod 214, so that the operative positions thereof may likewise be observed.

The satellite piston unit shown in FIGURES 5 and 6 has the conduits disclosed in conjunction with FIGURE 1 which function as in FIGURE 1, namely 62, 63, 64, 65, 67, 68, 69, 70. Outlet conduits 69, 70 are sealed at 191a, 192a, respectively. Outlet bores 193a and 194a respectively communicate with bores 69, 70 and, in turn, have respective threaded sockets 195a, 196a for receiving connecting means communicating with bearings to receive lubrication.

The satellite piston unit block has bores 198a, 199a which perform the same piston unit joining function as bores 198, 199.

Cylinder block 160a has bores 200a, 201a extending therethrough. The first of these serves as part of the pathway for conduit 23, as shown in FIGURE 1, where this conduit passes completely through the unit 10. The second of these serves as part of the pathway for conduit 85, as shown in FIGURE 1, where this conduit also passes completely through the unit 10.

A unit like unit 10 in FIGURE 1 may be made up of a pilot piston and one or more than one satellite piston unit. In FIGURES 3–6, the pilot piston unit and each of the satellite piston unit blocks have open ended conduits for lubricant inlet into and for lubricant outlet from the cylinder. Means are required for connecting the conduits of adjacent piston units and for sealing the conduits upstream of the pilot piston unit and downstream of the final satellite piston unit.

Figure 7:
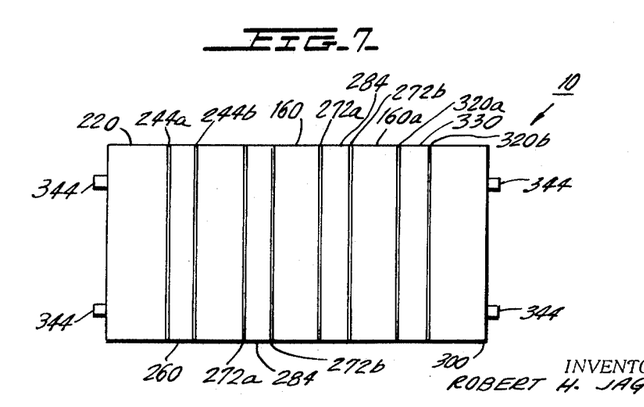
FIGURE 7 is a side elevation of a unit 10, schematically shown in FIGURE 1.

The unit 10 shown schematically in FIGURE 1 is actually comprised of a number of piston units and end or terminal or mounting blocks which are separated by appropriate flow redirecting plates and gaskets, shown in FIGURE 7. The elements in FIGURE 7 are described with reference to other figures herein. Briefly, unit 10 comprises a terminal, end or mounting block 220, to the left of, or upstream of a pilot piston block 160. A gasket 244a is interposed between the terminal block 220 and a flow redirecting plate 260. A second gasket 244b is interposed between the flow redirecting plate 260 and the pilot piston block 160. Plate 260 and block 220 seal the upstream end of unit 10.

Between pilot piston block 160 and a second flow redirecting plate 284 is positioned a gasket 272a. On the other side of plate 284 is a gasket 272b which separates the flow redirecting plate 284 from the satellite piston block 160a. Each subsequent satellite piston block 160a is separated from the preceding satellite piston block by the combination of a gasket 272a, a flow redirecting plate 284 and gasket 272b. After the final satellite piston block, there is a second terminal, or mounting, or end block 300 for closing off the downstream end of unit 10. Block 300 is separated by a gasket 320b from a flow redirecting plate 330 against the opposite surface of which is another basket 320a which seats against the final satellite piston block 160a in the unit.

Securing means 344 pass through the apertures 198 and 199 through all of the elements comprising the unit 10 for securing all of the elements tightly together.

The piston blocks 160 and 160a have been described, FIGURES 3–6. All of the other elements will now be described.

Figure 8:
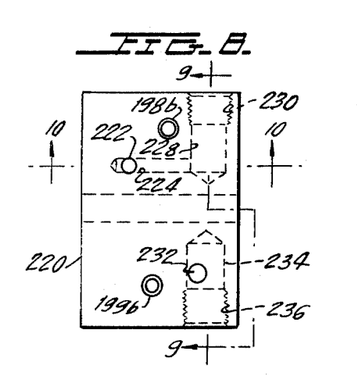
FIGURE 8 is a front elevation, showing the interior of an initial terminal block for a unit 10.
Figure 9:
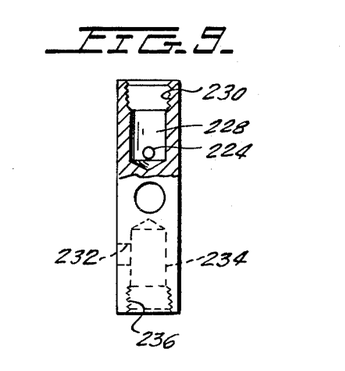
FIGURE 9 is a side view, partially cross sectioned of the block of FIGURE 8, along the lines and in the direction of arrows 9—9.
Figure 10:
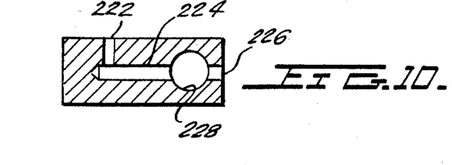
FIGURE 10 is a cross section along the line and in the direction of arrows 10—10 of the block of FIGURE 8.

Referring to FIGURES 8–10, terminal block 220 is a flat, rectangular sided block. It has a short bore 222 which is connected by intervening conduit means, to be described, to conduit 22 of the pilot piston unit of FIGURE 4. Bore 222 intersects and communicates with bore 224, which is sealed at 226. Transverse bore 228 intersects bore 224 and has a threaded opening 230 to receive a fitting which communicates with the inlet conduit 124 (FIGURE 2) leading from a central pump 110 or communicates with an outlet conduit 95 from a previous unit, such as unit 10, 102 or 104. The lubricant flow path from conduit 228 to pilot piston unit conduit 22 will be described below.

Block 220 also has a bore 232 (FIGURES 8, 9) extending into it and intersecting a transverse bore 234 which has a threaded entrance 236 in which a fitting may be secured. As will be described below, the conduit 232 receives the outflow from a conduit 85 exiting from the final piston unit in unit 10. The path leading to conduit 232 will be described below.

Block 220 additionally has openings 198b and 199b which pass through it and which function in the same manner as openings 198 and 199 to facilitate securing of mounting block 220 to the other elements in unit 10.

Figures 11, 12, 13:
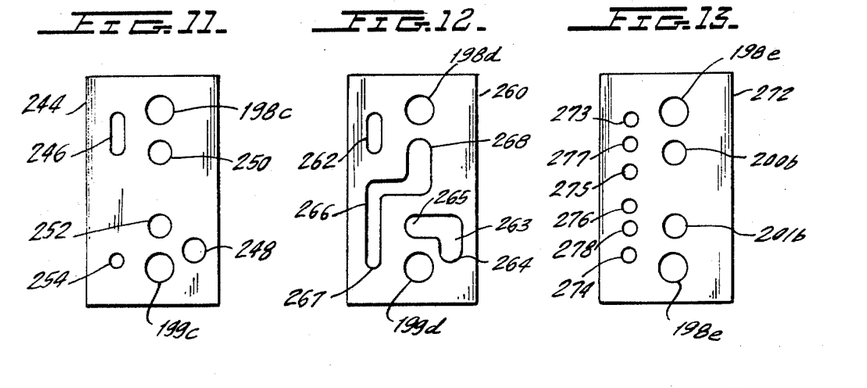
FIGURES 11–14 and 18 and 19 depict gaskets and flow redirecting plates which are positioned between piston units and terminal blocks.

As shown in FIGURE 7, positioned adjacent the terminal block 220 is a thin gasket 244a (FIGURE 11) which may be comprised of flexible, resilient material, whereby it can be squeezed tightly between flow directing plate 260, to be described, and terminal block 220 to form a liquid-tight seal. Sandwiched between plate 260 and the pilot piston unit block 160 is gasket 244b to form a similar liquid-tight seal. Single gasket 244 of FIGURE 11 is used for both of gaskets 244a and 244b to reduce the number of separate components that must be produced. Different ones of the apertures through the gasket are employed by each of the gaskets 244a, 244b.

Figure 18:
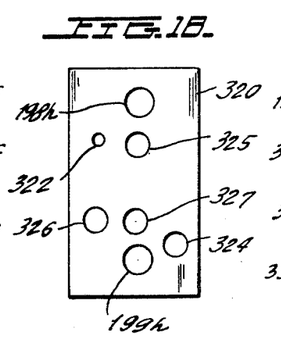

The same considerations apply to gaskets 272 (FIGURE 13) and 320 (FIGURE 18). These gaskets are comprised of a flexible, resilient material. They are dual purpose. Therefore, where a gasket 272 is so positioned that it has a sequentially earlier piston unit on one side thereof and a flow redirecting plate 284 on the other side thereof, it is referred to as gasket 272a. Where a gasket 272 has a flow redirecting plate 284 on one side and a sequentially succeeding piston unit on its other side, it is referred to as gasket 272b. With gasket 320, where it has a piston unit 160a on one side and flow redirecting plate 330 on its other side, it is referred to as gasket 320a. Where gasket 320 is located to have the flow redirecting plate 330 on one side and the terminal block 300 on its other side, it is referred to as gasket 320b.

Returning to FIGURE 11, gasket 244a has a slot opening 246 therethrough which communicates with conduit 222 of terminal block 220, to permit the inflow through conduit 222 to pass through gasket 244a. Gasket 244a also has an opening 248 therethrough which communicates with conduit 232 of terminal block 220 to permit the exit of liquid through conduit 232 from other conduits, as will be described. Gasket 244b has additional openings 250, 252 and 254 passing therethrough, the function of which will be described in conjunction with directing plate 260. Gasket 244 also has openings 198c and 199c for receiving the securing means 344 which hold the elements of unit 10 together.

FIGURE 12 shows flow redirecting plate 260. It has an opening 262 therethrough which communicates with openings 246 in gaskets 244a and b, thereby permitting the flow entering block 220 through conduit 228 to travel out through conduit 222, through opening 246 in gasket 244a, through opening 262 in block 260, through opening 246 in gasket 244b and into entry conduit 22 of pilot piston unit block 160, thereby to initiate movement of the pilot piston 20.

Plate 260 also has an L-shaped opening 263, the downward facing leg 264 of which communicates with the opening 248 through gasket 244a and the sideward facing leg 265 of which communicates with the opening 252 through gasket 244b. Opening 252 through gasket 244b communicates with the opening 201 through the cylinder block 160 of the pilot piston. Each of the pilot piston cylinder block 160 and all the satellite piston cylinder blocks 160a have an opening 201 forming a continuous conduit leading back from end, mounting or terminal block 300, to be described below. Accordingly, the flow path out of conduit 85 in FIGURE 1 travels through all of the openings 201 in the piston blocks 160, 160a, flow redirecting plates 284, gaskets 272; and through opening 252 in gasket 244b, opening 263 in flow redirecting plate 260, opening 248 in gasket 244a, conduit 232 in terminal block 220 and out conduit 234 in terminal block 220.

Flow redirecting block 260 also has an S-shaped opening 266 for forming a flow path leading into conduit 23 of pilot piston block 160 of FIGURES 1 and 3. The leg 267 of opening 266 communicates with opening 254 in gasket 244b and the leg 268 of plate 260 communicates with the opening 250 through gasket 244b. Each of the piston blocks 160, 160a, the flow redirecting plates 284 and gaskets 272 has an opening 200 therethrough which serves as the flow path for the upper leg of conduit 23, shown in FIGURE 1. Inflow into conduit 23 from pump $P_2$ is through the right-hand terminal block 300, discussed below. The inflow continues through all of the openings 200 in the piston units until it passes through opening 250 in gasket 244b, travels through opening 266 in flow redirecting plate 260 and flows out of and through opening 254 in gasket 244b. Opening 254 of gasket 244b communicates directly with inflow conduit 23 of the pilot piston unit cylinder block 160, whereby the flow entering the unit 10 from the right hand side thereof is enabled to enter the pilot piston unit through conduit 23 to cause the upward movement of the pilot piston 20 in the unit.

In addition to the other openings described above, flow redirecting plate 260 has openings 198d and 199d therethrough for receiving mounting means 344 to be passed therethrough.

Turning to FIGURE 13, gasket 272 has a number of lubricant flow openings through it, including openings 273, 274 and 275, 276 and 277, 278. Openings 273, 274 are part of gasket 272b which is on the upstream side of the next succeeding piston unit 160a. They lead into the inlet conduits, e.g. 62, 63, respectively, to a piston block. Openings 275, 276 and 277, 278 are part of a gasket 272a which is on the downstream side of a preceding piston block 160. Openings 275, 276, respectively, communicate with input conduits, e.g. 67, 68 to grooves 66, 71; and openings 277, 278, respectively, communicate with and receive flow from outflow conduits 64, 65.

Figure 14:
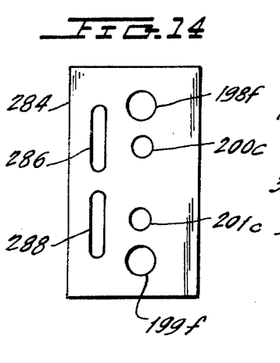

Turning, for now, to FIGURE 14, flow redirecting plate 284 has elongated openings 286 and 288 which respectively communicate with openings 273, 277, 275 and 276, 278, 274 in both of the gaskets 272a and b.

Gasket openings 273–278 and the plate openings 286, 288 cooperate as follows. Exit flow from a piston unit exit conduit 24, or 44, or 64, passes through opening 277 in gasket 272a, is redirected by slotted opening 286 in flow redirecting plate 284, passes through opening 273 in gasket 272b and into inflow conduit 42, 62 or 82 of the next succeeding piston unit. Similarly, the outflow from piston unit exit conduit 25, or 45, or 65 flows through the opening 278 of gasket 272a, is redirected by the slotted opening 288 in flow redirection plate 284, and passes through opening 274 in gasket 272b to the inlet conduit 43, 63 or 83 of the next succeeding piston unit.

As each of pistons 40, 60 and 80 ascends to pump lubricant out to associated bearings, the lubricant above one of pistons 40, 60 or 80 exits through one of conduits 82, 62 or 42, through opening 273 of gasket 272b, opening 286 of plate 284, and opening 275 in gasket 272a, whereby the lubricant being pumped is enabled to pass through one of conduits 67, 47 or 27 into the associated piston block.

Similarly, as each of pistons 40, 60 or 80 is descending, the lubricant below it exits through one of conduits 83, 63 or 43, passes through outlet opening 274 in gasket 272b, through flow redirecting slot 288 in plate 284, through opening 276 in gasket 272a and through one of conduits 68, 48 or 28 into the associated piston block.

Returning to FIGURE 13, gasket 272 also has openings 200b and 201b therethrough for serving as flow paths as described above for the flow, respectively, through conduits 23 and 85. Finally, gasket 272 has openings 198e and 199e for permitting securing means 344 to be passed through the entire unit 10.

Similarly, plate 284 has openings 200c, 201c therethrough for serving as part of conduits 23 and 85, respectively. It also has openings 198f and 199f for receiving the securing means 344.

Figure 15:
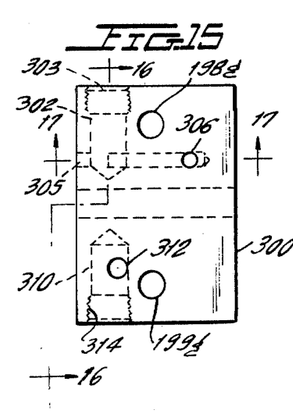
FIGURE 15 is a front elevation, showing the interior of a final terminal block for a unit 10.
Figures 16, 17:
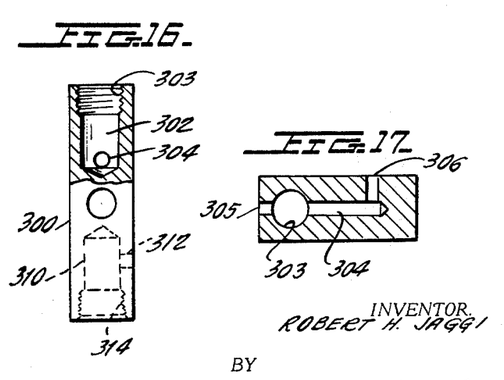
FIGURE 16 is a side view, partially cross-sectioned, of the block of FIGURE 15, along the lines and in the direction of arrows 16—16.
FIGURE 17 is a cross section along the line and in the direction of arrows 17—17 of the block of FIGURE 15.

Consideration will now turn to FIGURES 15 through 17 and the right-hand or last in sequence end, mounting or terminal block 300. Turning to FIGURE 1, for the moment, from the final cylinder 81 in the sequence there leads an exit conduit 95 to a subsequent unit, like unit 10 in the system or to a pressure sensing means. Additionally, there is an entry conduit, from pump P₂, that leads ultimately to conduit 23 which enters the lower end of cylinder 21.

Terminal block 300 has an outlet conduit 302 having a threaded upper end 303 to which a fitting is connected which leads either to a subsequent unit, such as unit 10, or to a pressure sensing means. Conduit 302 is the last stage of conduit 95 in FIGURE 1. Bore 302 is intersected by a transverse bore 304 which extends into block 300 and is sealed by sealing plug 305. Intersecting bore 304 is another bore 306 through which the lubricant eventually exiting from unit 10 may enter block 300.

Block 300 has a lower inlet bore 310 which is intersected by a transverse bore 312 that extends out of the same side of block 300 as the entrance to bore 306. Bore 310 also has a threaded outer end 314 for receiving a fitting. Bore 310 is the beginning or upstream end of conduit 23, shown schematically in FIGURE 1.

As with every other element in unit 10, block 300 has openings 198g and 199g extending therethrough for receiving the fastening means 344 which hold the entire unit together.

Positioned adjacent block 300 is gasket 320b shown in FIGURE 18. Gasket 320b has an opening 322 which registers with the entrance to bore 306 of block 300 and has an opening 324 which registers with the exit from bore 312 in block 300.

Gaskets 320a and b also have openings 198h and 199h therethrough for receiving fastening means 344.

Figure 19:
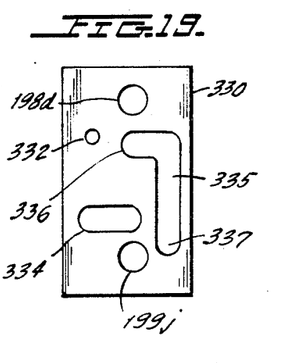

Gasket 320a has openings 325, 326 and 327 therethrough, the function of which will become apparent during the discussion of flow redirecting plate 330 shown in FIGURE 19.

Plate 330 has an opening 332 therethrough which registers with the opening 322 in both of gaskets 320a and 320b. The opening 322 through gasket 320a is in alignment with the exit conduit 84 from the final piston block 160a in the sequence. Accordingly, the lubricant exiting from the final piston block passes through opening 322 in gasket 320a, opening 332 in block 330, opening 322 in gasket 320b and through bores 306, 304 and 302 of terminal block 300, thereby to exit from the unit 10, through conduit 95, as schematically illustrated in FIGURE 1.

Returning to FIGURE 19, flow redirecting block 330 also has a slotted opening 334 which covers both of the openings 326 and 327 in gasket 320a. The flow exiting from conduit 85 of the final piston unit block 160a passes through opening 326 in gasket 320a, flow redirecting slot 334 in block 330, out opening 327 in gasket 320a and back through aperture 201a through piston unit block 160a. There is thereby provided the flow direction reversal which is schematically illustrated for conduit 85 in FIGURE 1. Once passing through opening 201a of the final satellite piston unit, the flow continues through all the piston units and out the initial terminal block 220 in a manner which was described above.

Returning to FIGURE 19, flow redirecting block 330 also has an L-shaped slot opening 335 therethrough which includes legs 336 and 337. Leg 336 communicates with opening 325 in gasket 320a (FIGURE 18) and leg 337 communicates with opening 324 in gasket 320b. The inflow through what is schematically illustrated as conduit 23 in FIGURE 1 is accomplished by lubricant flowing through bore 310 of block 300, bore 312 of block 300, opening 324 in gasket 320b, slot 335 in flow redirecting block 330, opening 325 in gasket 320a and into opening 200a in the final piston unit block 160a. After passing through the opening 200a in the last of the piston unit blocks, the flow continues through all the openings 200 in the piston unit blocks and then through the slot opening 266 in flow redirecting block 260 to finally be directed to conduit 23 beneath the cylinder 21.

Returning to FIGURE 19, the flow redirecting block 330 has openings 198j and 199j therethrough for receiving the fastening means 344.

The foregoing description of FIGURES 7 through 19, describes one particular embodiment of unit 10 for a lubricating system. It is to be understood that flow conduit arrangement and the various elements in the unit may be varied in any manner now apparent to one skilled in the art to produce the result the present invention is designed to accomplish.

As can be seen from the above description of the invention, a novel central lubricating system of the sequential type has been provided having the advantages that it is simple, easily maintainable and reliable. Separate, novel, cooperating piston units have been provided substantially improving the reliability of the individual piston units and increasing the ease with which a faulty piston may be located and replaced. The pistons may be of any length to vary the lubricant flow volume and pistons may have one or two grooves serving as exit flow conduits to compensate for length variations. Furthermore, the pistons may have indicating means connected to them so that in the event of a breakdown, its location may be readily discovered. Additionally, a central lubricating system has been shown which employs piston units described above.

While the invention has been described with respect to several preferred embodiments, many modifications and variations will now become apparent to those skilled in the art. It is, therefore, preferred that the scope of the invention not be limited by the specific disclosure.

The embodiments of the invention in which an exclusive privilege or property is claimed are defined as follows.

1. A unit for a centralized lubricating system of the sequential type, said system having a central source of lubricant; said unit comprising a plurality of piston units for distributing lubricant; said piston units operating in a sequential order; said unit having an inlet;
   said plurality of piston units comprising:
   a pilot piston unit connected to said unit inlet;
   at least one satellite piston unit; each of said satellite piston units being in sequential order, with the first of said satellite piston units communicating with said pilot piston unit, and with each successive satellite piston unit communicating with the one preceding it;
   each of said piston units including;
   a cylinder block having a cylinder therein with a first and a second end;
   a piston situated in said cylinder and reciprocatingly movable therein between a first and a second end position, said piston having a peripheral groove means thereabout intermediate its ends;
   first and second conduits in said cylinder block communicating at one end thereof, respectively, with said first cylinder end and said second cylinder end, and the other end of said first and second conduits communicating out of said cylinder block for both transmitting lubricant into and expelling lubricant from the respective said end of said cylinder;
   said piston being responsive to the inflow of lubricating fluid through said first conduit for moving from said first piston position to said second piston position, and in so moving expelling lubricant through said second conduit; said piston being responsive to the inflow of lubricant through said second conduit for moving from said second piston position to said first piston position and in so moving, expelling lubricant through said first conduit;

third and fourth conduits in said cylinder block communicating at one end thereof with said cylinder and at the other end thereof out of said cylinder block; said third conduit communicating with said cylinder at a location to enable the conduit to provide an outlet through said cylinder from said first conduit when said piston is in its second position, and said fourth conduit communicating with said cylinder at a location to enable the conduit to provide an outlet through said cylinder from said second conduit when said piston is in its first position; said third conduit communicating with said cylinder at a position to enable said third conduit to be blocked by said piston when said piston is in other than said second position; and said fourth conduit communicating with said cylinder at a position to enable said fourth conduit to be blocked by said piston when said piston is in other than said first position, whereby flow from said cylinder through one of said third and said fourth conduits to the next succeeding cylinder in sequence is prevented until said piston is, respectively, fully in one of said second position and said first position, whereby further unit operation halts when one of said pistons fails to shift into one of said first and said second positions;

fifth and sixth conduits in said cylinder block and communicating between the outside of said cylinder block and third and fourth axially spaced positions, respectively, in said cylinder; at said third and fourth positions, said fifth and sixth conduits being separate from the other conduits in said cylinder block; said third position being located so that said fifth conduit communicates with said groove means for said piston when said piston is in said first piston position; said fourth position being located so that said sixth conduit communicates with said groove means for said piston when said piston is in said second piston position;

seventh and eighth conduits in said cylinder block communicating between the outside of said cylinder block and fifth and sixth axially spaced positions, respectively, in said cylinder; said fifth position being located so that said seventh conduit communicates with said groove means for said piston when said piston is in said first piston position; said sixth position being located so that said eighth conduit communicates with said groove means for said piston when said piston is in said second piston position, whereby when said piston is in said first position, lubricant can pass through said fifth conduit, said groove means and said seventh conduit to a bearing serviced by the flow from said seventh conduit; and when said piston is in said second position, lubricant can pass through said sixth conduit, said groove means and said eighth conduit to a bearing serviced by the flow from said eighth conduit;

said first and said second conduits of each satellite piston unit communicating, respectively, with said fifth and said sixth conduits of the immediately preceding piston unit in sequence, whereby the lubricant expelled through said first and said second conduits of each said satellite piston unit is fed back, respectively, to said fifth and sixth conduits of the preceding piston unit to lubricate bearings associated with the preceding said piston unit.

2. The unit for a central lubricating system as set forth in claim 1 further including indicator means connected to each of said satellite pistons to be actuated by movement thereof to provide an indication of the operative condition of each of said satellite pistons.

3. The unit for a central lubricating system as set forth in claim 1, wherein said unit inlet has means connected to it for directing inflow into said unit to only one at a time of said first and second conduits of said pilot piston unit; and for delaying the transference of inflow to the other of said first and said second conduits until after all of said pistons in said unit have shifted to one of their first and second positions.

4. The unit for a central lubricating system as set forth in claim 1, further including a final satellite piston unit which is final in sequential order;

said final satellite piston unit having conduits including only said first, said second, said third and said fourth conduits;

said unit having an outlet;

said third and said fourth conduits of said final satellite piston unit being connected to said unit outlet.

5. The unit for a central lubricating system as set forth in claim 4, wherein each said piston unit is a complete unit separable from and connectable with all other said piston units in said unit.

6. The unit for a central lubricating system as set forth in claim 5, wherein each said piston unit is connected to its neighboring piston units by separable flow redirecting means which connect up the conduits leading into the adjacent cylinder blocks, and further including terminal blocks at the upstream and downstream ends of said unit for directing flow into said pilot piston unit and out of said final satellite piston unit.

7. The unit for a central lubricating system as set forth in claim 6, further including indicator means connected to each of said satellite pistons to be actuated by movement thereof to provide an indication of the operative condition of each of said satellite pistons.

8. The unit for a central lubricating system as set forth in claim 1, wherein said groove means comprises at least one groove of a first width;

said fifth, sixth, seventh and eighth conduits, at said third, fourth, fifth and sixth positions, respectively, having a width approximating said first width.

9. The unit for a central lubricating system as set forth in claim 8, wherein said groove means for at least one of said pistons comprises two axially spaced grooves of said first width;

said at least one piston in said one of said piston units being of a length such that a single one of said grooves cannot be both at said third position when said piston is in its said first position and also at said fourth position when said piston is in said second position;

a first one of said grooves being at a location on said piston such that said first groove is at said third position when said piston is in its said first position;

a second one of said grooves being at a location on said piston such that said second groove is at said fourth position when said piston is in its said second position.

10. The unit for a central lubricating system as set forth in claim 9, wherein said at least one piston is of a length such that it would not shift sufficiently far by moving to its said second position to unblock said third conduit and such that it would not shift sufficiently far by moving to its said first position to unblock said fourth conduit;

said at least one piston including a narrowed width section at each end, each of which sections is of sufficient length that one of said narrowed width sections moves even with said third conduit and said fourth conduit when said at least one piston is at said second and said first position, respectively, whereby communication between said first and said third conduits past the narrowed piston section at one end and between said second and said fourth bores past the narrowed piston section at the other end, through said cylinder, will be possible after said piston shifts.

11. The unit for a central lubricating system as set forth in claim 10, further including indicator means connected to each of said satellite pistons to be actuated by movement thereof to provide an indication of the operative condition of each of said satellite pistons.

12. The unit for a central lubricating system as set forth in claim 11, wherein each said piston unit is a complete unit separable from and connectable with all other said piston units in a unit;

each said piston unit being connected to its neighboring piston units by separable flow redirecting means which connect up the conduits leading into the adjacent cylinder blocks, said unit including terminal blocks at the upstream and downstream ends of said unit for directing flow into said pilot piston unit and out of the final said satellite piston unit in sequence.

13. The unit for a central lubricating system as set forth in claim 11, further including a final satellite piston unit which is final in sequential order;

said final satellite piston unit having conduits including only said first, said second, said third and said fourth conduits;

said third and said fourth conduits of said final satellite piston unit being connected to said unit outlet.

14. The unit for a central lubricating system as set forth in claim 13, wherein said unit inlet has means connected to it for directing inflow into said unit to only one at a time of said first and second conduits of said pilot piston unit; and for delaying the transference of inflow to the other of said first and second conduits until after all of said pistons in said unit have shifted to one of their first and second positions.

15. The unit for a central lubricating system as set forth in claim 14, further including indicator means connected to each of said satellite pistons to be actuated by movement thereof to provide an indication of the operative condition of each of said satellite pistons.

16. A unit for a centralized lubricating system of the sequential type, said system having a central source of lubricant; said unit comprising a plurality of piston units for distributing lubricant; said piston units operating in a sequential order; each said unit having an inlet;

each said plurality of piston units comprising:

a pilot piston unit connected to said unit inlet;

at least one satellite piston unit; each of said satellite piston units being in sequential order, with the first of said satellite piston units communicating with said pilot piston unit, and with each successive satellite piston unit communicating with the one preceding it;

each of said piston units including:

a cylinder block having a cylinder therein with a first and a second end;

a piston situated in said cylinder and reciprocatingly movable therein between a first and a second end position, said piston having a peripheral groove means thereabout intermediate its ends;

first and second conduits in said cylinder block communicating at one end thereof, respectively, with said first cylinder end and said second cylinder end, and the other end of said first and second conduits communicating out of said cylinder block for both transmitting lubricant into and expelling lubricant from the respective said end of said cylinder;

said piston being responsive to the inflow of lubricating fluid through said first conduit for moving from said first piston position to said second piston position, and in so moving expelling lubricant through said second conduit; said piston being responsive to the inflow of lubricant through said second conduit for moving from said second piston position to said first piston position and in so moving, expelling lubricant through said first conduit;

third and fourth conduits in said cylinder block communicating at one end thereof with said cylinder and at the other end thereof out of said cylinder block; said third conduit communicating with said cylinder at a location to enable the conduit to provide an outlet through said cylinder from said first conduit when said piston is in its second position and said fourth conduit communicating with said cylinder at a location to enable the conduit to provide an outlet through said cylinder from said second conduit when said piston is in its first position; said third conduit communicating with said cylinder at a position to enable said third conduit to be blocked by said piston when said piston is in other than said second position; and said fourth conduit communicating with said cylinder at a position to enable said third conduit to be blocked by said piston when said piston is in other than said first position, whereby flow from said cylinder through one of said third and said fourth conduits to the next succeeding cylinder in sequence is prevented until said piston is, respectively, fully in said second position and said first position, whereby further unit operation halts when one of said pistons fails to shift into one of said first and said second positions;

fifth and sixth conduits in said cylinder block communicating between the outside of said cylinder block and third and fourth axially spaced positions, respectively, in said cylinder; said third position being located so that said fifth conduit communicates with said groove means for said piston when said piston is in said first piston position; said fourth position being located so that said sixth conduit communicates with said groove means for said piston when said piston is in said second piston position;

seventh and eighth conduits in said cylinder block communicating between the outside of said cylinder block and fifth and sixth axially spaced positions, respectively, in said cylinder; said fifth position being located so that said seventh conduit communicates with said groove means for said piston when said piston is in said first piston position; said sixth position being located so that said eighth conduit communicates with said groove means for said piston when said piston is in said second piston position, whereby when said piston is in said first position, lubricant can pass through said fifth conduit, said groove means and said seventh conduit to a bearing serviced by the flow from said seventh conduit; and when said piston is in said second position, lubricant can pass through said sixth conduit, said groove means and said eighth conduit to a bearing serviced by the flow from said eighth conduit;

said first and said second conduits of each satellite piston unit communicating respectively, with said fifth and said sixth conduits of the immediately preceding piston unit in sequence, whereby the lubricant expelled through said first and said second conduits of each said satellite piston unit is fed back, respectively, to said fifth and sixth conduits of the preceding piston unit to lubricant bearings associated with the preceding said piston unit;

each said unit further including a final satellite piston unit which is final in sequential order;

said final satellite piston unit having conduits including only said first, said second, said third and said fourth conduits;

each said unit having an outlet; said third and said fourth conduits of said final satellite piston unit being connected to said unit outlet;

said units being arranged in sequential order and including a first unit and a last unit; said pilot piston unit of said first unit in sequence communicating through its said first conduit to said central supply source;

said final satellite piston unit of said first unit in sequence communicating through its said third conduit with said first conduit of said last unit in sequence;

said pilot piston unit of said last unit in sequence communicating through its said second conduit to said central supply source;

said final satellite piston unit of said last unit communicating through its said fourth conduit to said second conduit of said first unit, whereby when said central source communicates with said first conduit of said pilot piston unit of said first unit, the pistons in said first unit shift to their respective said second positions, in sequence; and only after all the pistons on said first unit have shifted, then will the pistons in said last unit shift in sequence, commencing with said pilot piston unit therein, to their respective said second positions; and whereby when said central source communicates with said second conduit of said pilot piston unit of said last unit, the pistons in said last unit shift to their respective said first positions, in sequence; and only after all the pistons in said last unit have shifted, then will the pistons in said first unit shift in sequence, commencing with said pilot piston unit therein, to their respective said first positions;

flow directing means for selectively directing flow from said central supply source to one of said first conduits of said pilot piston unit of said first unit and said second conduit of said pilot piston unit of said last unit.

17. A centralized lubricating system as set forth in claim 16, said system further including, cycle completion sensing means communicating with said third conduit of said final satellite piston unit of said last unit and with said fourth conduit of said final satellite piston unit of said first unit for sensing when all of said pistons have completed their move, in sequence, to one of said first and said second piston positions; said cycle completion sensing means being connected to said flow directing means for causing said flow directing means to direct flow to said first conduit of said pilot piston unit when all of said pistons are in their said first positions so that said pistons will be shifted to their said second positions, and for causing said flow directing means to direct flow to said second conduit of said pilot piston unit of said final unit when all of said pistons are in their said second positions so that said pistons will be shifted to their said first positions.

18. A centralized lubricating system as set forth in claim 17, wherein said cycle completion sensing means comprises at least one pressure sensing switch which senses lubricant pressure in a conduit and acts upon said flow directing means.

19. A centralized lubricating system as set forth in claim 17, wherein said flow directing means comprises a solenoid switch means adapted to be operated by said cycle completion sensing means.

20. A centralized lubricating system as set forth in claim 19, wherein said cycle completion sensing means comprises at least one pressure sensing switch which senses lubricant pressure in a conduit and acts upon said flow directing means.

21. A centralized lubricating system as set forth in claim 17, wherein a pressure relief means communicates with said first and said second conduits for each of said pilot piston units, so that as each said pilot piston shifts to its said first and said second positions, the lubricant trapped in the cylinder end toward which the piston is moving is relieved, enabling said pilot pistons to operate.

22. A centralized lubricating system as set forth in claim 21, wherein the arrangement of said conduits and the connections to said units of said flow directing means cooperate as part of said pressure relief means.

References Cited

UNITED STATES PATENTS

| | | | |
|---|---|---|---|
| 2,937,716 | 5/1960 | Schlosshaver | 184—7 |
| 2,986,234 | 5/1961 | Akamatsu et al. | 184—7 |
| 3,024,869 | 3/1962 | Akamatsu et al. | 184—7 |
| 3,219,146 | 11/1965 | Leese et al. | 184—7 |
| 3,298,460 | 1/1967 | Porter et al. | 184—7 |
| 3,414,085 | 12/1968 | Fujita | 184—7 |

FRED C. MATTERN, Jr., Primary Examiner

M. A. ANTONAKAS, Assistant Examiner

U.S. Cl. X.R.

137—596